3,271,108
PREPARATION OF LITHIUM HYDRIDE

George S. Fujioka, Walnut Creek, Calif., assignor to The Dow Chemical Company, Midland, Mich., a corporation of Delaware
No Drawing. Filed Mar. 26, 1962, Ser. No. 183,329
5 Claims. (Cl. 23—204)

Lithium hydride is finding increased utility in the propellant field due to its low molecular weight. Heretofore, the preparation of lithium hydride has been limited to hydriding lithium metal at elevated temperatures or reducing a lithium halide with a reducing metal such as magnesium at elevated temperatures and hydriding the molten lithium metal thus obtained. A low temperature process for the preparation of lithium hydride is greatly desirable.

Thus, it is an object of this invention to provide a process for the manufacture of lithium hydride A further object is to provide a process for the preparation of lithium hydride wherein a low reaction temperature may be used.

The above and other objects are attained according to this invention by reacting a lithium halide such as a chloride, bromide, or iodide, with sodium hydride in an inert organic diluent. By reacting the lithium halide with sodium hydride a low temperature, simple process may be used for the preparation of lithium hydride.

Any organic inert diluent in which at least one of the reactants is partially soluble may be used. A preferred diluent is one in which both of the reactants are at least partially soluble, such as tetrahydrofuran, tetrahydropyran, 1,4-dioxane, and 1,2-dimethoxyethane. However, other organic diluents such as trimethylamine, and pyridine may be used.

The reaction may be carried out at about 20° C. or room temperature, but it is generally preferred to intermix the lithium halide with the sodium hydride in the organic diluent at an elevated temperature to increase the rate of reaction. While a temperature as high as 150° C. may be used, it is generally preferred to carry out the reaction at a temperature in the range of 60° to 100° C. Generally the reaction is carried out at atmospheric pressure except when a low boiling solvent is used. A pressure above atmospheric may then be employed to keep the solvent from vaporizing.

Generally stoichiometric amounts of the reactants are employed. However, a slight excess of the lithium halide may be used to shift the equilibrium in the reaction mixture to more completely react the sodium hydride. The amount of the diluent used may be widely varied. Often, it is convenient to use a sufficient amount of the diluent to dissolve the reactants.

Various known methods for the recovery of lithium hydride from solutions may be employed to recover the lithium hydride from the reaction mixture. The reaction mixture may be evaporated to remove a major portion of the diluent and the constituents then separated by fractional crystallization. At times it may be more convenient to extract the lithium hydride or other constituents from the reaction mixture by use of a selective solvent, such as tetrahydrofuran or 1,2-dimethoxyethane, prior to evaporation. In the event the lithium hydride is substantially insoluble in the diluent, it may be simply covered by settling or filtration.

To further illustrate the invention, about ½ gm. mole of lithium chloride was slurried with ½ gram mole of sodium hydride in 1000 milliliters of tetrahydrofuran in a flask under an inert atmosphere of nitrogen. The lithium hydride formed was substantially insoluble in the tetrahydrofuran and precipitated. The reaction mixture was filtered to recover the lithium hydride formed with the undissolved portion of the reactants. The cake obtained was washed with additional tetrahydrofuran to remove the unreacted lithium chloride. Approximately 0.28 mole of lithium hydride was thus obtained which represented about 56 percent conversion of the lithium chloride to lithium hydride.

Similar results were obtained when lithium bromide and lithium iodide were used in place of the lithium chloride.

What is claimed is:
1. A process for the preparation of lithium hydride which comprises intermixing a lithium halide selected from the group consisting of lithium chloride, lithium bromide and lithium iodide with sodium hydride in an inert organic diluent in which at least one of the reactants is at least partially soluble, to thereby react the lithium halide with sodium hydride at a temperature in the range of from 20° C. to 150° C. to form lithium hydride and recovering the lithium hydride from the reaction mixture.
2. A process according to claim 1 wherein the inert organic solvent is tetrahydrofuran and the reaction temperature is in the range of 60° to 100° C.
3. A process according to claim 2 wherein the lithium halide is lithium chloride.
4. A process according to claim 2 wherein the lithium halide is lithium bromide.
5. A process according to claim 2 wherein the lithium halide is lithium iodide.

No references cited.

MILTON WEISSMAN, Primary Examiner.

CARL D. QUARFORTH, OSCAR VERTIZ, Examiners.

L. A. SEBASTIAN, J. D. VOIGHT,
Assistant Examiners.